US008608361B2

(12) United States Patent
Kim et al.

(10) Patent No.: US 8,608,361 B2
(45) Date of Patent: Dec. 17, 2013

(54) BACKLIGHT UNIT AND THREE-DIMENSIONAL IMAGE DISPLAY DEVICE HAVING THE SAME

(75) Inventors: JoongHyun Kim, Asan-si (KR);
Jinsung Choi, Cheonan-si (KR);
Byoung Dae Ye, Yongin-si (KR); Taeho Lee, Seoul (KR); Yongkyu Kang, Asan-si (KR); Sangwon Lee, Incheon (KR)

(73) Assignee: Samsung Display Co., Ltd. (KR)

( * ) Notice: Subject to any disclaimer, the term of this patent is extended or adjusted under 35 U.S.C. 154(b) by 68 days.

(21) Appl. No.: 13/351,592

(22) Filed: Jan. 17, 2012

(65) Prior Publication Data

US 2012/0243086 A1 Sep. 27, 2012

(30) Foreign Application Priority Data

Mar. 24, 2011 (KR) .................. 10-2011-0026565

(51) Int. Cl.
*F21V 33/00* (2006.01)
(52) U.S. Cl.
USPC ........... 362/608; 362/602; 362/612; 362/616; 362/97.3
(58) Field of Classification Search
USPC ......... 362/602, 603, 604, 608, 612, 613, 616, 362/97.2, 97.3
See application file for complete search history.

(56) References Cited

U.S. PATENT DOCUMENTS

| 7,246,932 B2 * | 7/2007 | Burtsev et al. ................. 362/616 |
| 7,554,752 B2 * | 6/2009 | Tamaoki et al. .............. 359/726 |
| 2003/0169385 A1 | 9/2003 | Okuwaki |
| 2004/0085660 A1 | 5/2004 | Hara |
| 2007/0201226 A1 | 8/2007 | Nishigaki |
| 2007/0268692 A1 | 11/2007 | Chen et al. |
| 2008/0204631 A1 | 8/2008 | Takada |
| 2010/0283914 A1 | 11/2010 | Hamada |
| 2011/0273906 A1 * | 11/2011 | Nichol et al. ................. 362/607 |

FOREIGN PATENT DOCUMENTS

| JP | 3585781 B2 | 8/2004 |
| JP | 2008268398 A | 11/2008 |
| KR | 1020040008955 A | 1/2004 |
| KR | 1020080110173 A | 12/2008 |
| WO | 03006876 A1 | 1/2003 |
| WO | 2011007277 A3 | 1/2011 |

* cited by examiner

*Primary Examiner* — Laura Tso
(74) *Attorney, Agent, or Firm* — Cantor Colburn LLP

(57) ABSTRACT

A three-dimensional ("3D") image display device includes a backlight unit. The backlight unit includes a light guide part including a plurality of light guide units. Each of the light guide units includes a light guide plate including a light emission surface through which supplied light is emitted, a bottom surface which faces the light emission surface, and side surfaces which connect the light emission surface to the bottom surface, a plurality of light sources which emit light toward at least one of the side surfaces, and a band pass filter between the side surface to which the light is emitted and the light sources.

23 Claims, 4 Drawing Sheets

BACKLIGHT UNIT AND THREE-DIMENSIONAL IMAGE DISPLAY DEVICE HAVING THE SAME

This application claims priority to Korean Patent Application No. 10-2011-0026565, filed on Mar. 24, 2011, and all the benefits accruing therefrom under 35 U.S.C. §119, the entire contents of which are hereby incorporated by reference.

BACKGROUND OF THE INVENTION (1) Field of the Invention

The disclosure herein relates to a backlight unit and a three-dimensional ("3D") image display device having the same, and more particularly, to a backlight unit capable of preventing quality of a 3D image from being deteriorated due to mixture of left and right eye images, and a 3D image display device having the same.

(2) Description of the Related Art

In general, a 3D image display device separates left and right eye images having a binocular disparity from each other to respectively display the separated left and right eye images on left and right eyes of an observer. Thus, the observer sees the left and right eye images through the left and right eyes to mix the images with each other in a brain, thereby realizing a 3D effect.

The 3D image display device alternately displays the left and right eye images on the display panel to realize the 3D image. When the image displayed on the display panel is converted from the left eye image into the right eye image or from the right eye image into the left eye image, the left and right eye images are mixed with each other due to a scanning process of the display panel to deteriorate quality of the 3D image.

BRIEF SUMMARY OF THE INVENTION

The disclosure provides a backlight unit capable of preventing quality of a 3D image from being deteriorated due to mixture of left and right eye images.

The disclosure also provides a 3D image display device including the back light unit.

Embodiments of the disclosure provide a backlight unit including a light guide part including a plurality of light guide units. Each of the light guide units includes: a light guide plate including a light emission surface through which supplied light is emitted, a bottom surface which faces the light emission surface, and side surfaces which connect the light emission surface to the bottom surface; a plurality of light sources which emit light toward at least one of the side surfaces; and a band pass filter between the side surface to which the light is emitted and the light sources.

In some embodiments, the light guide part may include a first light guide unit and a second light guide unit sequential in a direction in which light is emitted from the first light guide unit.

In other embodiments, the band pass filter may include a plurality of filter units including a plurality of films which are stacked and have refractive indexes different from each other.

In still other embodiments, each of the filter units may include a first film, and a second film on the first film and having a refractive index different from a refractive index of the first film.

In even other embodiments, the first film may include polyethylene naphthalate and the second film may include polystyrene.

In yet other embodiments, the band pass filter may include five filter units which are stacked.

In other embodiments of the invention, a 3D image display device includes: a display panel which displays left eye and right eye images; and a backlight unit which supplies light to the display panel. The backlight unit includes a light guide part including a plurality of light guide units, where each of the light guide units includes: a light guide plate including a light emission surface through which supplied light is emitted, a bottom surface which faces the light emission surface, and side surfaces which connect the light emission surface to the bottom surface; a plurality of light sources which emit light toward at least one of the side surfaces; and a band pass filter between the side surface to which the light is emitted and the light sources.

BRIEF DESCRIPTION OF THE DRAWINGS

The accompanying figures are included to provide a further understanding of the invention, and are incorporated in and constitute a part of this specification. The drawings illustrate exemplary embodiments of the invention and, together with the description, serve to explain principles of the invention. In the figures.

DETAILED DESCRIPTION OF THE INVENTION

Figure 1:
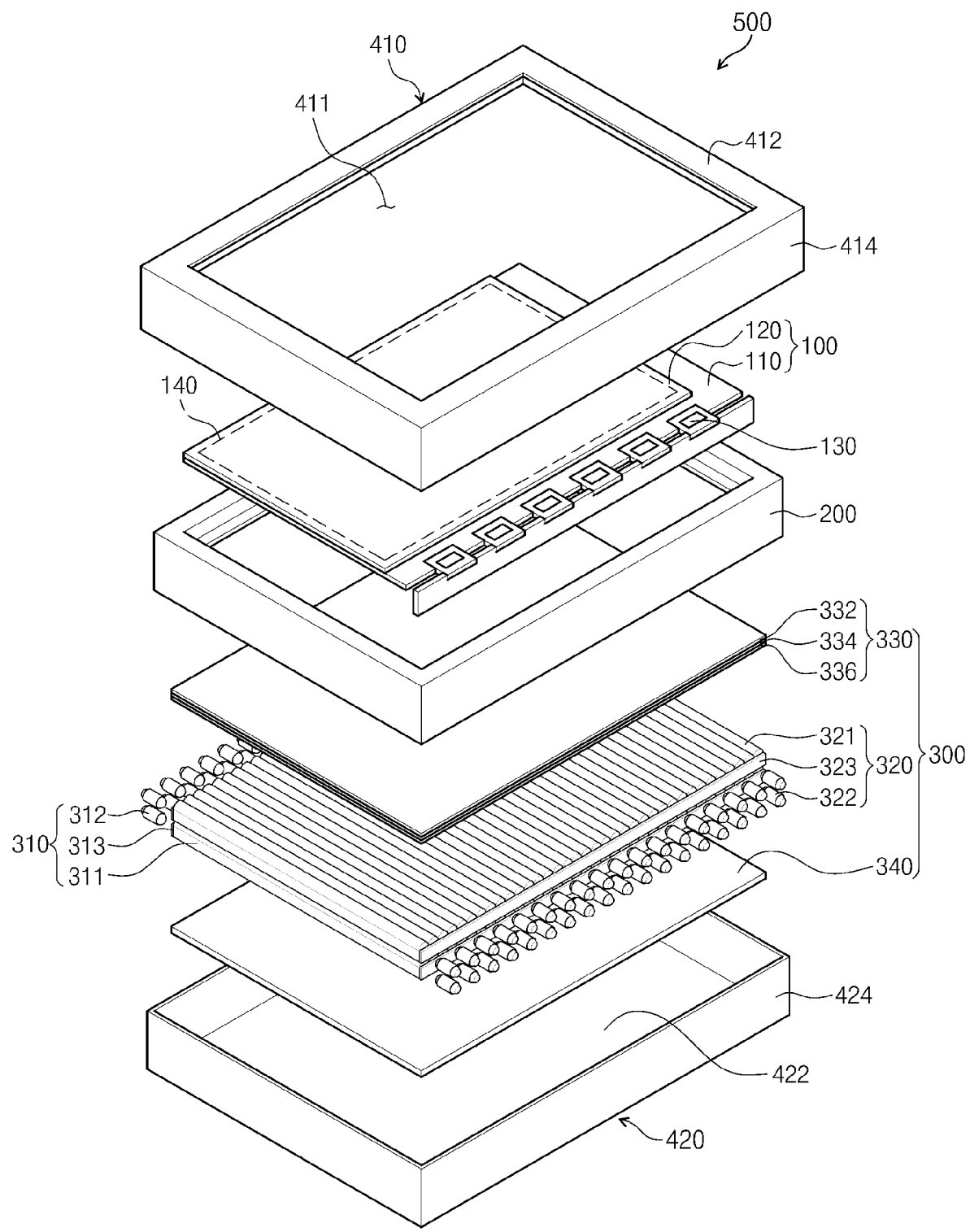
FIG. 1 is an exploded perspective view of an exemplary embodiment of a display device according to the invention.

Since the invention may have diverse modified embodiments, exemplary embodiments are illustrated in the drawings and are described in the detailed description of the invention. However, this does not limit the invention within specific embodiments and it should be understood that the invention covers all the modifications, equivalents, and replacements within the idea and technical scope of the invention.

Like reference numerals refer to like elements throughout. In the drawings, the dimensions and size of each structure are exaggerated, omitted, or schematically illustrated for convenience in description and clarity. It will be understood that although the terms of first and second are used herein to describe various elements, these elements should not be limited by these terms. Terms are only used to distinguish one component from other components. Therefore, a component referred to as a first component in one embodiment can be referred to as a second component in another embodiment. The terms of a singular form may include plural forms unless referred to the contrary.

The meaning of 'comprise', 'include', or 'have' specifies a property, a region, a fixed number, a step, a process, an element and/or a component but does not exclude other properties, regions, fixed numbers, steps, processes, elements and/or components. In the specification, it will be understood that when a layer (or film), a region, or a plate is referred to as being 'on' another layer, region, or plate, it can be directly on the other layer, region, or plate, or intervening layers, regions, or plates may also be present. In the specification, it will be understood that when a layer (or film), a region, or a plate is referred to as being 'under' another layer, region, or plate, it can be directly under the other layer, region, or plate, or intervening layers, regions, or plates may also be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the invention will be described in detail with reference to the accompanying drawings.

FIG. 1 is an exploded perspective view of an exemplary embodiment of a display device according to the invention.

Referring to FIG. 1, the display device according to the invention includes a backlight unit 300, an upper cover 410, and a lower cover 420.

Various panels such as a liquid crystal display panel ("LCD") or an electrophoretic display panel ("EDP") may be used as the display panel 100. In the illustrated embodiment, the LCD is described.

The display panel 100 has a rectangular plate shape in a plan view, having a long side and a short side. An image is displayed on a display area 140 of the display panel 100. Also, the display area is divided into two areas to respectively display a left eye image and a right eye image on the two areas. Also, the display panel 100 includes an array substrate 110, an opposite substrate 120 facing the array substrate 110, and a liquid crystal layer (not shown) between the array substrate 110 and the opposite substrate 120.

According to an embodiment of the invention, the array substrate 110 may include a plurality of pixels (not shown) arranged in a matrix form. Here, each of the pixels may include a plurality of sub pixels. Each of the sub pixels may have one of red, green, and blue colors. Also, each of the pixels includes a gate line (not shown) extending in a first direction, e.g., a direction parallel to an edge of the array substrate 110, a data line (not shown) extending in a second direction perpendicular to the first direction to insulatedly cross the gate line, and a pixel electrode (not shown). Also, each of the pixels includes a thin film transistor (not shown) electrically connected to the gate line and the data line and electrically connected to correspond to the pixel electrode. The thin film transistor switches a driving signal transmitted into the pixel electrode corresponding to the thin film transistor.

Also, a driver IC 130 may be on a side of the array substrate 110. The driver IC 130 receives various signals from the outside and outputs the driving signal for driving the display panel 100 in response to the inputted various signals toward the thin film transistor.

The opposite substrate 120 may include an RGB color filter (not shown) which realizes a predetermined color using light provided from the backlight unit 300 on a surface thereon, and a common electrode (not shown) on the RGB color filter to face the pixel electrode. Here, the RGB color filter may be manufactured through a thin film process. Although the color filter on the opposite substrate 120 is described as an example in the invention, the invention is not limited thereto. In an alternative embodiment, for example, the color filter may be on the array substrate 110.

Liquid crystal molecules of the liquid crystal layer may be arranged in a specific direction by a voltage applied into the pixel electrode and the common electrode to adjust transmittance of the light provided from the backlight unit 300, thereby allowing the display panel 100 to display an image.

A mold frame 200 is on an edge of the display panel 100 to support a lower portion of the display panel 100. The mold frame 200 has an approximately square ring shape. The mold frame 200 may be provided in a single unitary indivisible element as shown in FIG. 1. However, as necessary, the mold frame 200 may include a plurality of separate pieces connected together to form the mold frame 200. Also, the mold frame 200 may be omitted as necessary.

The backlight unit 300 is under (e.g., overlaps) the display panel 100. The backlight unit 300 includes a light guide part including a plurality of light guide units 310 and 320, an optical member 330, and a reflective sheet 340. Here, the light guide part may include a first light guide unit 310 under the display panel 100, and a second light guide unit 320 between the first light guide unit 310 and the display panel 100.

Each of the first light guide unit 310 and the second light guide unit 320 includes light guide plates 311 and 321, a plurality of light sources 312 and 322 generating and emitting light onto the light guide plates 311 and 321, and band pass filters 313 and 323 between the light guide plates 311 and 321 and the light sources 312 and 322, respectively.

The optical member 330 may be between the second light guide unit 320 and the display panel 100. The optical member 330 may control light emitted from the second light guide unit 320. Also, the optical member 330 includes a diffusion sheet 336, a prism sheet 334, and a protective sheet 332.

The diffusion sheet 336 may diffuse light emitted from the second light guide unit 320. The prism sheet 334 may collect the light diffused by the diffusion sheet 336 in a direction perpendicular to that of a plane of the display panel 100. The light passing through the prism sheet 334 is incident almost into the display panel 100. The protective sheet 332 is on the prism sheet 334. The protective sheet 332 protects the prism sheet 334 against an external impact.

Although the optical member 330 includes one of the diffusion sheet 336, one of the prism sheet 334, and one of the protective sheet 332 in the illustrated embodiment, the invention is not limited thereto. In an alternative embodiment, for example, the optical member 330 may include a plurality of at least one of the diffusion sheet 336, the prism sheet 334, and the protective sheet 332. Alternatively, as necessary, one of the diffusion sheet 336, the prism sheet 334, and the protective sheet 332 may be omitted.

A reflective sheet 340 for reflecting leaking light not provided toward the display panel 100 to change a path of the light in the direction of the display panel 100 is directly under the first light guide unit 310. The reflective sheet 340 includes a material capable of reflecting light. The reflective sheet 340 is on the lower cover 420 to reflect light generated from the light sources 312 and 322. As a result, the reflective sheet 340 increases the amount of light provided toward the display panel 100.

The upper cover 410 is above the display panel 100. The upper cover 410 has a shape corresponding to that of the display panel 100. The upper cover 410 includes an upper surface 412 in which a window 411 for exposing the display area 140 of the display panel 100 is defined and supporting an edge of a front surface of the display panel 100, and upper cover side surfaces 414 extending from the upper surface 412 and in a direction of the lower cover 420. The upper cover side surfaces 414 may be bent from the upper surface 412 to form a single, unitary, indivisible upper cover 410. Here, since the display panel 100 has a square plate shape, the upper cover 410 may have four side surfaces. The upper cover 410 is coupled to the lower cover 420 and supports the edge of the front surface of the display panel 100.

The lower cover 420 is under the backlight unit 300. The lower cover 420 includes a bottom surface 422 having a shape corresponding to those of the display panel 100 and the backlight unit 300, and lower cover side surfaces 424 extending from the bottom surface 422 and upward. The lower cover side surfaces 424 may be bent from the bottom surface 422 to form a single, unitary, indivisible lower cover 420. Here, since each of the display panel 100 and the backlight unit 300 has a square shape, the lower cover 420 may have four side surfaces. The lower cover 420 includes a space defined by the bottom surface 422 and the lower cover side surfaces 424 and which receives the display panel 100 and the backlight unit 300. Also, the lower cover 420 is coupled to the upper cover 410 to receive the display panel 100 and the backlight unit 300 therein, and supports the display panel 100 and the backlight unit 300.

Figure 2:
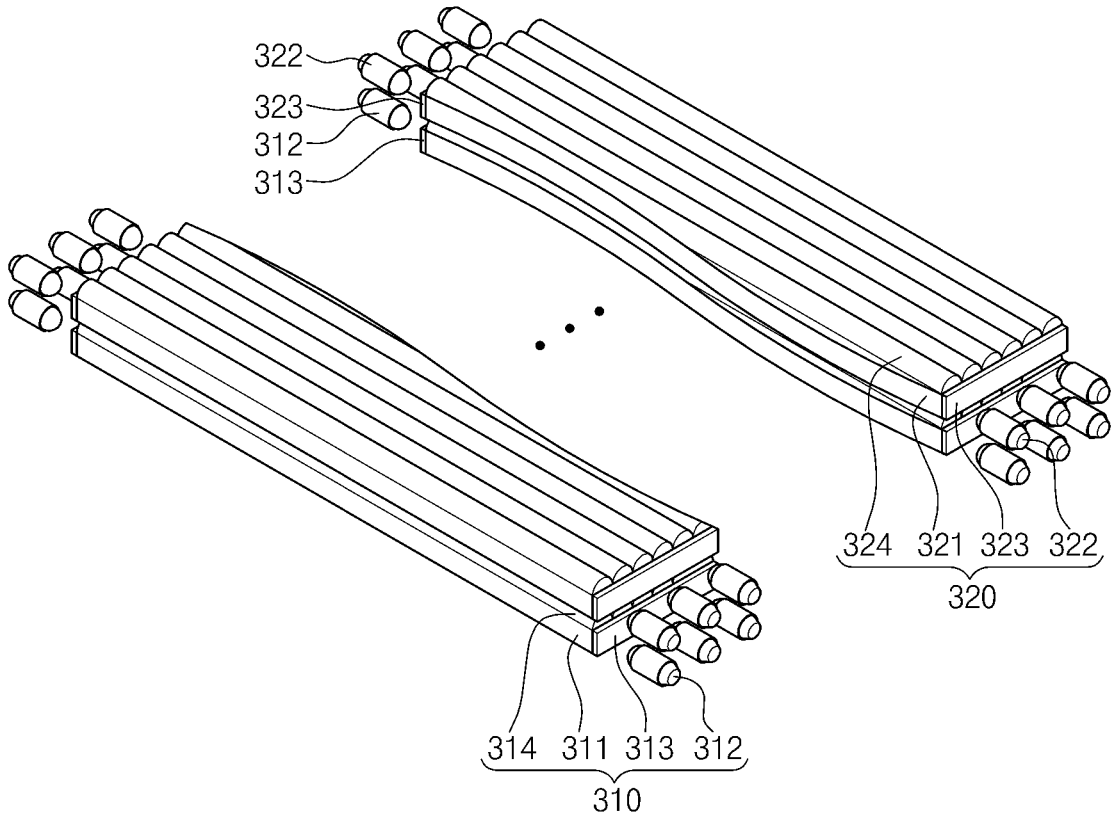
FIG. 2 is a perspective view of an exemplary embodiment of a light guide part used in the display device of FIG. 1.
Figure 3:
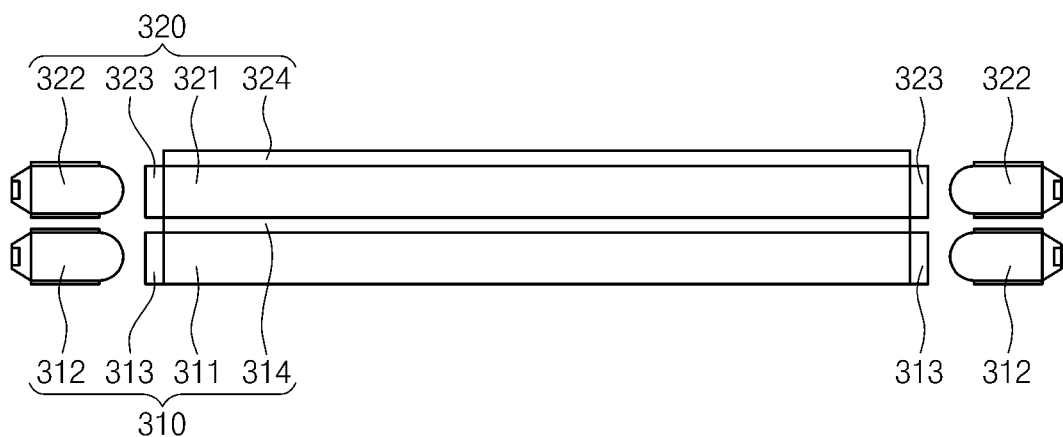
FIG. 3 is a cross-sectional view illustrating the light guide part of FIG. 2.
Figure 4:
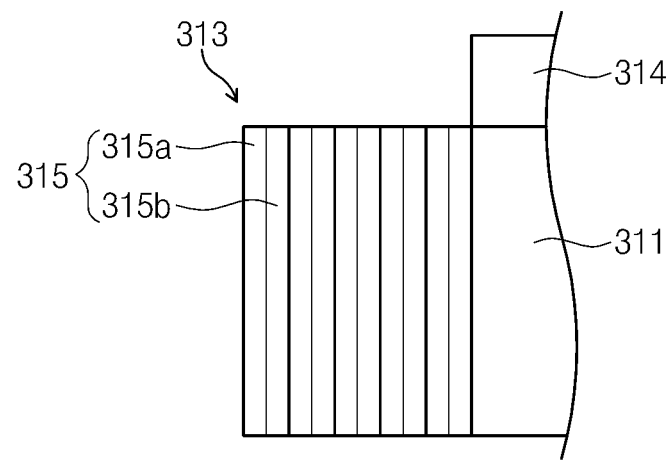
FIG. 4 is an enlarged view illustrating an exemplary embodiment of a band pass filter of FIG. 3.

FIG. 2 is a perspective view of an exemplary embodiment of a light guide part used in the display device of FIG. 1. FIG. 3 is a cross-sectional view illustrating the light guide part of FIG. 2. FIG. 4 is an enlarged view illustrating an exemplary embodiment of a band pass filter of FIG. 3.

Referring to FIGS. 2 to 4, the light guide part includes the first light guide unit 310 and the second light guide unit 320 sequentially in a direction in which light is emitted from the first light guide unit 310.

Each of the first light guide unit 310 and the second light guide unit 320 includes the light guide plates 311 and 321 overlapping at least the display area 140 of the display panel 100, the plurality of light sources 312 and 322 emitting light onto the light guide plates 311 and 321, and the band pass filters 313 and 323 between the light guide plates 311 and 321 and the light sources 312 and 322, respectively.

Each of the light guide plates 311 and 321 includes a light emission surface through which light supplied from the light sources 312 and 322 is emitted toward the display panel 100, a bottom surface facing the light emission surface, and side surfaces connecting the light emission surface to the bottom surface. Here, each of the light emission surface and the bottom surface may have various shapes. The number of side surfaces may be determined by a shape of each of the light emission surface and the bottom surface. In one embodiment, for example, each of the light emission surface and the bottom surface may have a square shape. Here, the light guide plates 311 and 321 may have four side surfaces.

Also, each of the light guide plates 311 and 321 may include polycarbonate ("PC"). Also, the light guide plates 311 and 321 may further include light diffusion patterns 314 and 324 on the light emission surfaces, respectively. The light diffusion patterns 314 and 324 diffuse the light emitted from the light emission surface.

The light sources 312 and 322 emit light onto at least one of the side surfaces of the light guide plates 311 and 321. Here, the light is used for displaying an image on the display panel 100. The light emitted from each of the light sources 312 and 322 is supplied into the light guide plates 311 and 321 through the band pass filters 313 and 323. Here, the light sources 312 and 322 may be mounted on a printed circuit board (not shown) in a package form. Each of the light sources 312 and 322 may be a light emitting diode. The light sources 312 of the first light guide unit 310 are coplanar with the light guide plate 311. Similarly, the light sources 322 of the second light guide unit 320 are coplanar with the light guide plate 321.

The band pass filters 313 and 323 transmit a portion of the light emitted from the light sources 312 and 322 to supply the transmitted light to the light guide plates 311 and 321. Also, the band pass filters 313 and 323 selectively reflect the rest of the emitted light. Here, each of the band pass filters 313 and 323 may include a plurality of filter units 315 in which a plurality of films having reflective indexes different from each other are stacked.

Also, each of the filter units 315 includes first and second films 315a and 315b including a polymer material. The second film 315b is in a direction in which light is emitted from the first film 315a. Also, the first film 315a may include polyethylene naphthalate ("PEN"). The second film 315b may include polystyrene ("PS").

Here, the first film 315a and the second film 315b reflect light having a portion of a wavelength of light emitted from the light sources 312 and 322, e.g., at least one light of red, green, and blue light. Also, the wavelengths reflected by the first and second films 315a and 315b may be determined according to thicknesses of each of the first and second films 315a and 315b. The thicknesses of the first and second films 315a and 315b are expressed as following Equation (1).

$$(2n+1)*\lambda/4 = n_A*d_A = n_B*d_B \quad (1)$$

where n is a positive number greater than 0, $n_A$ denotes a refractive index of the second film 315b, $d_A$ denotes a thickness of the second film 315b, $n_B$ denotes a refractive index of the first film 315a, and $d_B$ denotes a thickness of the first film 315a. The PS used for the second film 315b may have a refractive index of about 1.52, and the PEN used for the first film 315a may have a refractive index of about 1.85.

The following Table 1 shows thicknesses of the first and second films 313a and 315b for reflecting centroid wavelengths of red, green, and blue light according to Equation (1). Here, when the first film 315a includes PEN, the first film 315a has a refractive index of about 1.85. Also, when the second film 315b includes PS, the second film 315b has a refractive index of about 1.52.

TABLE 1

Thicknesses of first and second films for reflecting centroid wavelengths of red, green, and blue light

|  | Red light (630 nm) | Green light (540 nm) | Blue light (450 nm) |
| --- | --- | --- | --- |
| Thickness of second film | 104 nm | 89 nm | 74 nm |
| Thickness of first film | 85 nm | 73 nm | 61 nm |

Referring to Table 1, when the filter unit 315 includes the first and second films 315a and 315b, it is seen that thicknesses of the first and second films 315a and 315b are adjusted to reflect centroid wavelengths of two light of the red, green, and blue light and transmit the other light. In the illustrated embodiment, for example, when the first film 315a has a thickness of about 85 nanometers (nm) to reflect the red light and the second film 315b has a thickness of about 89 nm to reflect the green light, the filter unit 315 reflects light having the centroid wavelengths of 630 nm and 540 nm of the red and green light, respectively, and transmit the other remaining light.

Also, when the filter unit 315 includes an additional film (not shown) except the first and second films 315a and 315b, the additional film may further reflect light having a specific wavelength except the red and green light.

When the filter units 315 of the band pass filters 313 and 323 included in the first and second light guide units 310 and 320 have constitutions (e.g., materials and/or dimensions)

different from each other, the filter units 315 may reflect light having wavelengths different from each other.

The band pass filters 313 and 323 should reflect about 70% or more of light, except light to be transmitted. Here, reflectances of the band pass filters 313 and 323 are expressed as following Equation (2).

$$R_{max} = \left[\frac{n_m/n_s - (n_B/n_A)^{2N}}{n_m/n_s + (n_B/n_A)^{2N}}\right]^2 \qquad (2)$$

where N is the number of filter units 315 of the band pass filters 313 and 323, $n_m$ denotes a refractive index of the atmosphere, $n_s$ denotes refractive indexes of the light guide plates 311 and 321.

The following Table 2 shown reflectances of the band pass filters 313 and 323 according to Equation (2). Here, when the first film 315a includes PEN, the first film 315a has a refractive index of about 1.85. Also, when the second film 315b includes PS, the second film 315b has a refractive index of about 1.52. The atmosphere has a refractive index of about 1. When each of the light guide plates 311 and 321 includes PC, each of the light guide plates 311 and 321 has a refractive index of about 1.59.

TABLE 2

Reflective index in centroid wavelength of each of band pass filters

| | The number of filter unit | | | | |
|---|---|---|---|---|---|
| 1 | 2 | 3 | 4 | 5 | 6 |
| Refractive index 16.3% | 30.7% | 45.6% | 59.1% | 70.2% | 78.8% |

Referring to Table 2, it is seen that the refractive index is increased as the number of filter units 315 of the band pass filters 313 and 323 is increased. Specifically, when the band pass filters 313 and 323 include five filter units 315 or more, it is seen that the refractive index is above about 70%.

Thus, when the band pass filters 313 and 323 include five filter units 315 or more, the band pass filters 313 and 323 may reflect about 70% or more of light, except light to be transmitted.

As described above, the band pass filters 313 and 323 may selectively reflect light to transmit only light having a desired wavelength.

Figure 5:
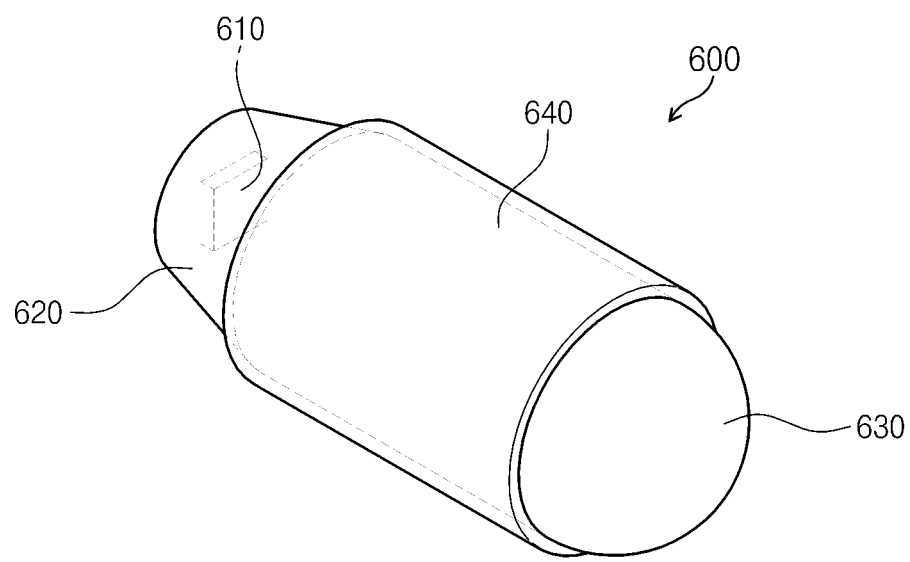
FIG. 5 is a perspective view of an exemplary embodiment of a light source used in the display device of FIG. 1.
Figure 6:
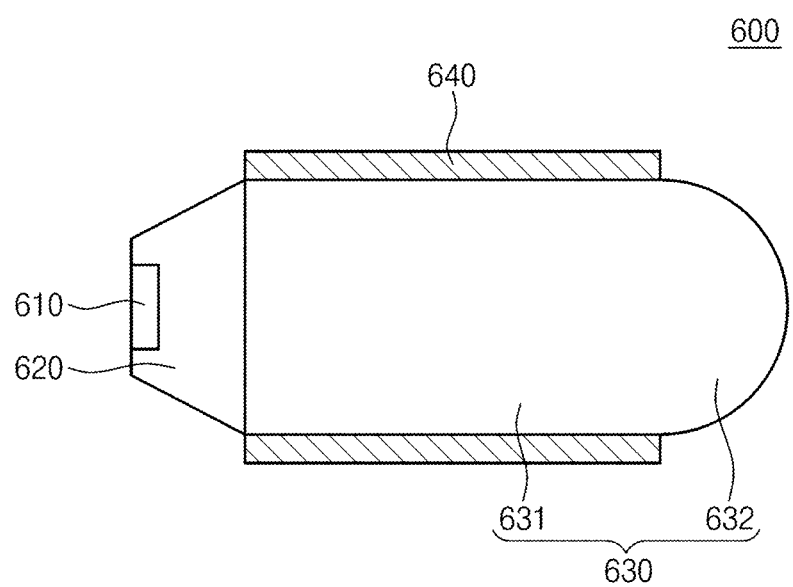
FIG. 6 is a cross-sectional view illustrating the light source of FIG. 5.

FIG. 5 is a perspective view of an exemplary embodiment of a light source used in the display device of FIG. 1 and FIG. 6 is a cross-sectional view illustrating the light source of FIG. 5.

Referring to FIGS. 5 and 6, a light source 600 includes a light emitting diode ("LED") chip 610, a molding part 620 encapsulating the LED chip 610, and a lens part 630 collecting light generated from the LED chip 610. Also, the light source 600 may have a light emitting angle of about −15 degrees to about 15 degrees with respect to a center of the LED chip 610. This is done because the light source 600 is applied to the display device 500 to minimize light leaking in case where light is emitted onto the light guide plates 311 and 321.

The LED chip 610 is a kind of p-n junction semiconductor in which electrons and holes are combined with each other to emit light. That is, the LED chip 610 is one of semiconductor devices in which a current flows to form a carrier including a small number of electrons and holes, and light is emitted using energy emitted when the electrons and holes are recombined with each other. Also, the LED chip 610 may be mounted on a lead frame (not shown) and electrically connected to a printed circuit board (not shown).

The molding part 620 encapsulates the LED chip 610 to isolate the LED chip 610 from an external environment. Here, the molding part 620 may have a cone shape in which an area of a surface on which the LED chip 610 is seated is less than that opposite to the surface.

The lens part 630 may be on a surface of the molding part 620 on a path of light emitted from the LED chip 610, e.g., a surface opposite to a surface on which the LED chip 610 is seated on the molding part 620. Also, the lens part 630 includes a light guide part 631 for guiding light emitted from the LED chip 610 to transmit the molding part 620, and a light collection part 632 at a front end of the light guide part 631 through which the light is emitted to collect the light. Here, the light guide part 631 may have a cylindrical shape due to the molding part 620. Also, the light collection part 632 may have a dome shape. Also, the light guide part 631 may have a length of about 2 millimeters (mm) to about 6 mm, and a diameter of about 3 mm to about 5 mm. This is done for a reason that the light guide part 631 effectively guides the light emitted from the LED chip 610.

Each of the molding part 620 and the lens part 630 has light transmission with respect to air and moisture. Each of the molding part 620 and the lens part 630 includes a material having superior light transmission. The material having the superior light transmission may be one selected from a group consisting of glass and resin. The resin may be one selected from a group consisting of a silicon resin, an epoxy resin, an acrylic resin, a urethane resin, a photoresist, and equivalents thereof.

Also, the light source 600 may further include a reflective member 640 surrounding the light guide part 631 to reflect the light leaking through the light guide part 631 of the lens part 630 in the light emitted from the LED chip 610, thereby increasing light efficiency of the light source 600. Thus, more light in the light emitted from the LED chip 610 may be emitted onto the light guide plates 311 and 321.

The backlight unit according to the invention separates light having a desired wavelength to provide the separated light toward the display panel. Thus, a 3D image display device including the backlight unit may reduce or effectively prevent deterioration of a quality of the 3D image due to the mixture of left and right eye images.

The above-disclosed subject matter is to be considered illustrative and not restrictive, and the appended claims are intended to cover all such modifications, enhancements, and other embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description.

What is claimed is:
1. A backlight unit comprising:
a light guide part comprising a plurality of light guide units, wherein each of the light guide units comprises:
a light guide plate comprising a light emission surface through which supplied light is emitted, a bottom surface which faces the light emission surface, and side surfaces which connect the light emission surface to the bottom surface;
a plurality of light sources which emit light toward at least one of the side surfaces; and a band pass filter which is between the side surface to which the light is emitted and the light sources, and selectively transmits and reflects portions of the emitted light.

2. The backlight unit of claim 1, wherein the light guide part comprises a first light guide unit and a second light guide unit sequential in a direction in which light is emitted from the first light guide unit.

3. The backlight unit of claim 1, wherein the band pass filter comprises a plurality of filter units each including a plurality of films which are stacked and have refractive indexes different from each other.

4. The backlight unit of claim 3, wherein each of the filter units comprises a first film, and a second film on the first film and having a refractive index different from a refractive index of the first film.

5. The backlight unit of claim 4, wherein the first film includes polyethylene naphthalate and the second film includes polystyrene.

6. The backlight unit of claim 3, wherein the band pass filter comprises at least five filter units which are stacked.

7. The backlight unit of claim 3, wherein the band pass filter
transmits selected wavelengths of the emitted light, to the light guide plate, and
reflects about 70% or more of non-selected wavelengths of the emitted light.

8. The backlight unit of claim 1, wherein each of the light sources comprises:
a light emitting diode chip;
a molding part which encapsulates the light emitting diode chip; and
a lens part which collects light emitted from the light emitting diode chip.

9. The backlight unit of claim 8, wherein the lens part comprises:
a light guide part which guides the light emitted from the light emitting diode chip, and
a light collection part which collects the light guided by the light guide part.

10. The backlight unit of claim 9, wherein each of the light sources further comprises a reflective member which surrounds the light guide part.

11. The backlight unit of claim 9, wherein the light guide part is about 3 millimeters to about 5 millimeters in diameter, and about 2 millimeters to about 6 millimeters in height.

12. The backlight unit of claim 8, wherein each of the light sources has a light emitting angle of about −15 degrees to about 15 degrees with respect to a center of the light emitting diode chip.

13. The backlight unit of claim 1, wherein the light guide plate further comprises a light diffusion pattern on the light emission surface.

14. A three-dimensional image display device comprising:
a display panel which displays left eye and right eye images; and
a backlight unit which supplies light to the display panel, wherein the backlight unit comprises a light guide part comprising a plurality of light guide units,
wherein each of the light guide units comprises:
a light guide plate comprising a light emission surface through which supplied light is emitted, a bottom surface which faces the light emission surface, and side surfaces which connect the light emission surface to the bottom surface;
a plurality of light sources which emit light toward at least one of the side surfaces; and
a band pass filter between the side surface to which the light is emitted and the light sources.

15. The three-dimensional image display device of claim 14, wherein the light guide part comprises a first light guide unit and a second light guide unit sequential in a direction in which light is emitted from the first light guide unit.

16. The three-dimensional image display device of claim 14, wherein the band pass filter comprises a plurality of filter units each including a plurality of films which are stacked and have refractive indexes different from each other.

17. The three-dimensional image display device of claim 16, wherein each of the filter units comprises a first film, and a second film on the first film and having a refractive index different from a refractive index of the first film.

18. The three-dimensional image display device of claim 17, wherein the first film includes polyethylene naphthalate and the second film includes polystyrene.

19. The three-dimensional image display device of claim 16, wherein the band pass filter comprises at least five filter units which are stacked.

20. The three-dimensional image display device of claim 14, wherein each of the light sources comprises:
a light emitting diode chip;
a molding part which encapsulates the light emitting diode chip; and
a lens part which collects light emitted from the light emitting diode chip.

21. The three-dimensional image display device of claim 20, wherein the lens part comprises:
a light guide part which guides the light emitted from the light emitting diode chip; and
a light collection part which collects the light guided by the light guide part.

22. The three-dimensional image display device of claim 21, wherein each of the light sources further comprises a reflective member which surrounds the light guide part.

23. A method of displaying a three-dimensional image, the method comprising
emitting light to a band pass filter of a backlight unit of a three-dimensional image display device which displays left eye and right eye images;
transmitting image light through the band pass filter;
reflecting about 70% or more of non-image light by the band pass filter; and
providing the transmitted image light to a display panel of the three-dimensional image display device to display the left eye and right eye images,
wherein the backlight unit comprises:
a plurality of light sources which emits the light,
a light guide plate which receives the light and supplies the light to the display panel, and
the band pass filter between a side surface of the light guide plate and the light sources.

* * * * *